(12) United States Patent
Porter et al.

(10) Patent No.: US 7,890,361 B2
(45) Date of Patent: Feb. 15, 2011

(54) METHOD FOR THE IMMEDIATE ESCALATION OF AT LEAST ONE RULE CHANGE IN A CATALOG MANAGEMENT SYSTEM

(75) Inventors: H. Keith Porter, Durham, NC (US); David Grining, Graham, NC (US); Scott W. Jensen, Charlotte, NC (US); Michael Croasdaile, Germantown, WI (US)

(73) Assignee: International Business Machines Corporation, Armonk, NY (US)

( * ) Notice: Subject to any disclaimer, the term of this patent is extended or adjusted under 35 U.S.C. 154(b) by 2929 days.

(21) Appl. No.: 10/429,533

(22) Filed: May 5, 2003

(65) Prior Publication Data

US 2004/0225541 A1 Nov. 11, 2004

(51) Int. Cl.
G06F 9/44 (2006.01)
G06F 17/50 (2006.01)

(52) U.S. Cl. .......................................................... 705/7
(58) Field of Classification Search ....................... 705/7
See application file for complete search history.

(56) References Cited

U.S. PATENT DOCUMENTS

| | | | |
|---|---|---|---|
| 5,758,327 A | 5/1998 | Gardner et al. ................. 705/26 |
| 6,070,142 A * | 5/2000 | McDonough et al. ........... 705/7 |
| 6,085,169 A | 7/2000 | Walker et al. .................. 705/26 |
| 6,108,639 A | 8/2000 | Walker et al. .................. 705/26 |
| 6,400,810 B1 * | 6/2002 | Skladman et al. ......... 379/93.24 |
| 7,209,916 B1 * | 4/2007 | Seshadri et al. ................. 707/3 |
| 2004/0024888 A1 * | 2/2004 | Davis et al. .................. 709/229 |
| 2004/0148201 A1 * | 7/2004 | Smith et al. ..................... 705/4 |

OTHER PUBLICATIONS

Richard Karpinski (Mar. 1999). IBM Adds Catalog Builder to E-Commerce Tool Suite. InternetWeek,(757), PG8. Retrieved Sep. 24, 2007, from ABI/INFORM Global database.*

(Continued)

*Primary Examiner*—Beth V Boswell
*Assistant Examiner*—Folashade Anderson
(74) *Attorney, Agent, or Firm*—Jason O. Piche, Esq.; Scott D. Paul, Esq.; Carey Rodriguez Greenberg & Paul LLP (57) ABSTRACT

In a rules based management system for controlling multiple levels of related catalogs, a method for immediate escalation of, and response to, a request from a customer to change a rule associated with the customer. The rules associated with the customer are used to derive the customer's catalog and each rule is associated with the person imposing the rule, called the owner of the rule. The method prevents, or at least minimizes, customer frustration with administrators of the catalogs by providing automated escalation of the customer's rule change request to the owner of the rule. The owner of the rule may physically reside in the same geographic location as the customer or in an entirely different country than the customer. Starting with the catalog used by the customer, catalogs are search in order of ancestry until the owner of the rule is found. The rule owner is alerted to the presence of the customer's request and a response, which may be an approval, a denial, or a request to discuss the matter further, is sent to the customer. If the response is an approval, then the rule is changed and the catalog reflects the rule change the next time the customer accesses the catalog.

19 Claims, 8 Drawing Sheets

OTHER PUBLICATIONS

Arthur Gingrande (May 1, 2001). Catalog Management: Content Management's Flagship Application. KMWorld.com, 4 pgs. Retrieved Sep. 24, 2007, from http://www.kmworld.com/Articles/ReadArticle.aspx?ArticleID=9232.* www.blazesoft.com (Feb. 10, 2002). Blaze Advisor. 12 pgs. Retrieved Sep. 24, 2007 from http://web.archive.org/web/20020210140641/http://www.blazesoft.com/index.html.*

"PeopleSoft Enterprise Catalog Management." Oracle White Paper. Facilitating Internet-Based Catalog(2002): 13. Sep. 24, 2007, <http://www.oracle.com/media/peoplesoft/en/pdf/whitepapers/e_srm_wp_catalogmgmt_0706.pdf>.*

Business/High Tech Editors & Internet/Online Writers (Jul. 20). IBM Announces High Performance E-commerce Software to Help Businesses Handle Growing Web Site Traffic. Business Wire,1. Retrieved Sep. 24, 2007, from Business Dateline database.*

Business Editors, High-Tech Writers (Jan. 24). Blaze Software and IBM Announce Expanded Relationship to Provide Enhanced Personalization Capabilities in WebSphere Commerce Suite. Business Wire,1. Retrieved Sep. 24, 2007, from Business Dateline database.*

"How Blaze Advisor Works." Business White Paper (2001): 19. Sep. 24, 2007, <http://qualitywriter.com/Samples/advisor_how.pdf>.*

Redbooks, Ibm. IBM Websphere Commerce Suite V4.1 for Os/390: First Steps (Ibm Redbooks). Internet: Ibm, 2001.*

The Evolving Importance of e-Service in Go-To-Market Strategies for Web-Based Enterprises. Metrix, http://www.metrix.com, p. 4, 2000.

Business Process Manager, eXcelon Corporation, http://www.exceloncorp.com, 2001.

The E-Process Revolution, eMotion, http://www.emotion.com/news/releases/seybold.html, p. 7, 2002.

Remedy's Leading eProcurement and Asset Management Solution Maximizes Lifetime of Corporate Assets, Remedy Corporation, http://www.realmarket.com/news/remedy030800.html, 2000.

Eprocurement Made Easy, elcom, http://www.elcom.com/elcom.asp?page=68, 2001.

Enterprise Buyer Desktop Edition 2.0 Eprocurement Solution, Sun Microsystems, p. 9, Feb. 20, 2001.

RightNow Web, RightNow Technologies, Seybold Report Aug. 17, 2000, p. 8. http://www.rightnow.com/news/seybold.html.

Self-Service, RightNow Technologies, http://www.rightnow.com/products/selfservice.html, 2002.

BuyerXpert/SellerXpert 4.1 Administrator's Guide: Contents, iPlane, pp. 25-26 http://www.iplanet.com.

* cited by examiner

WELCOME

Select from: ...
...
...

202

If you wish to request a change to your catalog (change the rules associated with your catalog), CLICK HERE.

RULE CHANGE REQUEST SUBMISSION FORM

Customer information:

302

Information regarding requested rule change:

304

Optional submission methods:

Telephone number;
    Facsimile number;
    E-mail addres.

METHOD FOR THE IMMEDIATE ESCALATION OF AT LEAST ONE RULE CHANGE IN A CATALOG MANAGEMENT SYSTEM

BACKGROUND OF THE INVENTION

The present invention relates generally to the field of management of electronic catalogs and more specifically to a method for immediate escalation of, and response to, a rule change request from a customer in a rules based management system.

Electronic catalogs are similar to traditional paper catalogs in that they can be used to display products and services of a company. Electronic catalogs, however, are much more flexible than paper catalogs in that they are more easily updated and can also be used in a manner similar to databases. Electronic catalogs can store legal and technical information, which an authorized customer can access and use to produce contracts and proposals. Electronic catalogs may also offer multiple capabilities to customers, for instance, a catalog can offer different types of reporting formats, invoicing procedures and distribution methods.

In a rules based management system for electronic catalogs, a set of rules are defined and the rules are applied to a data set to create a catalog. When one of the rules is changed, the contents or capabilities of the catalog are changed. Sub-catalogs can easily be derived from a parent catalog by copying the rules of the parent catalog, adding one or more rules specific to the sub-catalog, and applying the rules against the data set associated, with the parent catalog to create the sub-catalog. The rules act as filters for the data and each time a different set of rules are applied to the original data a different catalog is created. Capabilities available within a catalog, the types of displays presented, and other customer "entitlements" are based on the rules that are used to create the catalog. Subsequent descendant catalogs can also be derived from a sub-catalog. Thus, many sub-catalogs, that ultimately derive from the same-base catalog, can be created and managed by a single entity using a rules based management system. This system streamlines management of the catalogs and allows the entity to maintain administrative control over a wide variety of electronic catalogs.

In traditional electronic catalogs, a customer gains access to the catalog through a log-in process wherein customer provided information is used to verify the authenticity of the customer. The customer is identified during this log-in process and the rules associated with the customer are retrieved and applied to the data to create the customer's catalog. As used herein "customer" is given a very broad definition and, besides its traditional meaning, "customer" is meant to include retailers, wholesalers, marketers, developers, manufactures and distributors. Thus a seller of computers can be a "customer" when using an electronic catalog. For example, a customer (retailer or distributor) that deals in desktop computers may have his catalog limited to products and services related to desktop computers. A problem with traditional catalog systems however, is that if the customer subsequently increases the scope of his business and becomes interested in laptop computers, he would have to go through a manually intensive process of requesting increased inclusion of products for his catalog. This traditional rule change process can take long periods of time as the request must be manually forwarded, usually more than once, until it reaches the person with the authority to approve the requested rule change. The rules, in most cases, are set by more than one individual and, in large management entities, these individuals are usually not in the same geographic location. Lengthy manual processes such as this traditional rule change procedure are prone to errors and many times result in lost sales due to customer frustration. The present invention solves this problem.

Rules and data associated with electronic catalogs are usually stored on special computers known as servers and accessed via a network. Small networks called local area networks, or LAN's, and are traditionally used to connect computers within a single building or complex. Metropolitan area networks, or MAN's, refer to networks that connect computers throughout a city. Wide area networks, or WAN's, connect geographical areas larger than a city. The Internet, which is a worldwide network, can be considered the ultimate WAN. The hardware and software used to set up and run a network is referred to as the network's infrastructure. The Internet is an association of computer networks with common standards, which enable information to be sent from any host on one network to any host on another network. Originally developed in the 1970's to support military research, it has since grown and expanded to support commercial, educational, and other users. The World Wide Web is an Internet facility designed for multimedia use, in which individuals or organizations make available 'pages' of information to other users anywhere in the world. Access to these pages can be at no cost or, in the case of certain commercial operations, a fee can be required before access is granted. The Internet uses a client-server architecture to control the sending and receiving of information. In a client-server architecture, one computer (the server) has a supply of information and another computer (the client) requests some of the information. The request is forwarded form network to network until it reaches the network on which the server resides. The server then processes the request and responds by sending the requested information back to the client. During their travels across the Internet, requests and responses will likely encounter one or more gateways and routers. Gateways are located between computer networks and enable a network operating according to one protocol to pass messages to a second network working to a different protocol. Routers are devices that push traffic through a packet-switched network. As used herein, requests, responses, messages, traffic and packets each refer to digital information traveling over a network. In the Internet, routers are used to determine the best possible route for packets to reach their destination and forward the packets along that route.

The Internet provides many services to its users. E-mail is probably the most popular service. E-mail can be a simple text message that is typed at the user's keyboard, which is then sent to another user on the network. In the same way that a letter must be addressed correctly to reach its destination, an e-mail message must also specify the address of the person it is being sent to. The biggest advantage of using e-mail is that it reaches its destination much faster than traditional mail, usually in a matter of a few seconds. File Transfer Protocol (FTP) is known for easy downloading of public domain software and shareware programs. Bulletin Board Systems (BBS) are an electronic version of traditional bulletin boards found in public areas. Bulletin boards originated to provide users who have similar interests with a method of keeping in touch and sharing information. A BBS user "posts" messages or files about all kinds of subjects, and anyone who can access the BBS can view and respond to the messages.

Instant Messaging (IM) is a text messaging method of communication wherein messages are exchanged, usually within a dedicated window, in real time or near real time. As long as both parties are on-line, the parties can exchange text messages in a manner similar to a regular voiced conversation. When a person sends an instant message it causes a dialog window to open, or pop-up, on the recipient's screen. Some IM applications that are included in a network's infrastructure provide for this pop-up window function even when the IM program is not actively running on the recipient's computer. As with e-mail, IM messages can be accompanied by a "beep" or other sound to alert the recipient to the message.

Text messages can also be transmitted from a computer network to a digital telephone network and subsequently forwarded to a text messaging device. Text messaging devices include specialized beepers and cellular telephones. These devices include a keyboard for typing and a screen for displaying the text messages. In the case of cellular telephones, if a dedicated keyboard is not provided, the numeric keypad can be used to type out the text of a message. Digital communication systems also provide for computer generated voice messages and digital voice recordings to be sent from a computer network to a telephone network. These messages and recordings may be initiated by a computer on the Internet but terminate as a telephone call to a cellular telephone or even a traditional landline telephone.

SUMMARY OF THE INVENTION

A method for immediate escalation of a rule change request from a customer to change a rule that applies to a catalog associated with the customer, wherein the rule is a member of a set of rules that are used to create the catalog. The rule change request is escalated until it reaches an owner of the rule. The owner of the rule may be associated with the catalog or with an ancestor catalog from which the catalog is derived. A means for the customer to submit the rule change request is provided and a software module associated with the catalog receives and processes the rule change request. If the rule change request has been pre-approved, an automated response indicating approval of the request is sent to the customer and the set of rules are changed to reflect the approved rule change. If the request has not been pre-approved, the owner of the rule is located, the request is forwarded to the owner, and one or more alerts are sent to the owner alerting him to the presence of the request. The response from the owner of the rule is then sent to the customer. The response can indicate an approval of the request, a disapproval of the request with a reason for the disapproval, or a subsequent request from the owner of the rule to hold a dialog with the customer to discuss the rule change request. If the response is an approval, the set of rules is changed to reflect the approved rule change and the revised catalog is available to the customer the next time the customer accesses the catalog.

The means for submitting the rule change request can be a hyperlink to a request form, a voice telephone number, a facsimile telephone number, or an e-mail address. The owner of the rule is alerted to the presence of the request via an e-mail message, a pop-up instant message, a text message, and/or a telephone call to the owner of the rule, and the telephone call can be initiated by an administrator or by the software module. The rule change request may pertain to prices that are applicable to the customer, inclusion of products, services and/or capabilities within the catalog, or exclusion of products, services and/or capabilities from the catalog.

It is an object of the present invention to provide a quick and efficient method for meeting the changing needs of customers.

If is a further object of the present invention to provide real-time or near real-time responses to rule change requests from customers.

BRIEF DESCRIPTION OF THE DRAWINGS

The invention of the present application will now be described in more detail with reference to the accompanying drawings, given only by way of example, in which.

DETAILED DESCRIPTION OF THE INVENTION

The present invention provides for immediate escalation of a rule change request made by a customer of a catalog or sub-catalog. As used herein "customer" is given a very broad definition and, besides its traditional meaning, "customer" also includes retailers, wholesalers, marketers, developers, manufacturers and distributors. A customer, therefore, can be thought of as any "participant" in the cataloging system. A "catalog" as used herein refers to any rules based management system, wherein the customer's catalog is created based on the set of rules associated with the customer. The set of rules taken as a whole can be thought of as implementing the policy that exists between the customer and owner of the catalog.

Figure 1:
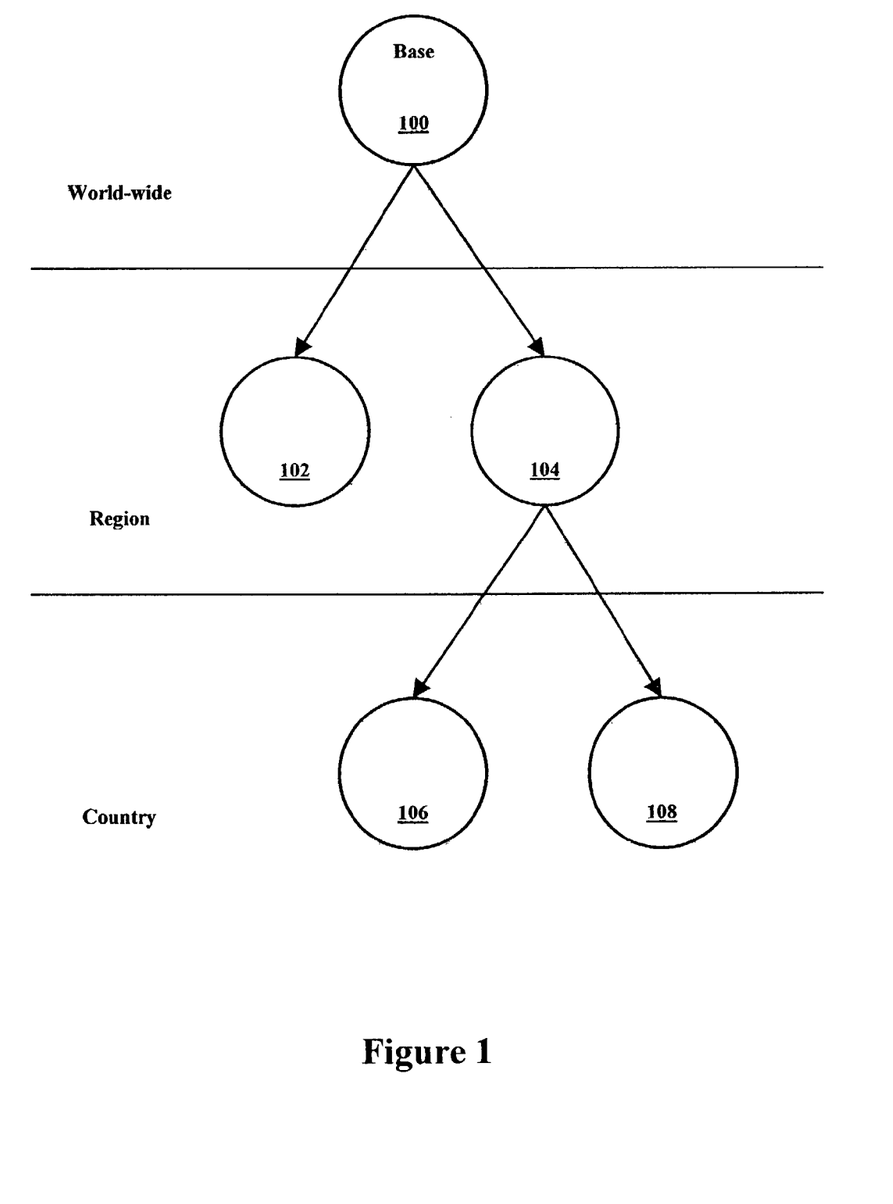
FIG. 1 is a schematic diagram showing an exemplary relationship between child and ancestor catalogs.

FIG. 1 illustrates the relationship between a base catalog 100 and the catalogs 102, 104, 106, and 108, that are derived therefrom. In practice, the owner of the catalog will list all products, services and capabilities available worldwide in his base catalog 100. For clarity purposes, and unless otherwise stated, the term "products" will be used to refer to products, services and capabilities. The owner of the catalog then employees filters, or rules, to derive one or more sub-catalogs 102 and 104 from the base catalog 100. In this example, the filters are selected based on the region of the world in which the sub-catalogs will be available and upon the customers that are to be targeted. Both sub-catalogs 102 and 104 inherit rules from base catalog 100. These inherited rules are either mandatory or optional. Optional rules may be changed locally by the sub-catalog. However, mandatory rules require escalation of a rule change request to an owner of the rule. Sub-catalogs 102 and 104 are not identical as both sub-catalogs also have explicit rules added to them based on the regions in which they are employed as well as other factors. The owner of a given rule that applies to sub-catalog 104 will either be at the regional level, in the case of explicit rules, or at the worldwide level, in the case of an inherited mandatory rule. Sub-catalogs 106 and 108 inherit the rules of sub-catalog 104 and each may also have explicit rules, or filters, applied to them based on the country in which they will be available and the targeted customers. An owner of a rule is a novel concept and dictates that every mandatory and explicit rule is associated with the person imposing the rule. Thus an owner of a rule of sub-catalog 108 may be associated with the base catalog 100, the regional catalog 104, or locally with sub-catalog 108. Each catalog maintains information on local owners of rules, i.e., the authors of non-inherited rules. Sub-catalog 108 has as its ancestor catalogs, sub-catalog 104 and base catalog 100. FIG. 1 is provided only by way of example and other sub-catalogs can have more than two ancestors. Further, sub-catalog 108 could also be used to derive a lower sub-catalog, for a specific city for example. This type of infrastructure employs a rules based management system and allows the products of multiple sub-catalogs to be changed merely by changing one inherited rule. This eliminates the need to manually add or delete products from many sub-catalogs individually, which can be extremely labor intensive.

Figure 2:
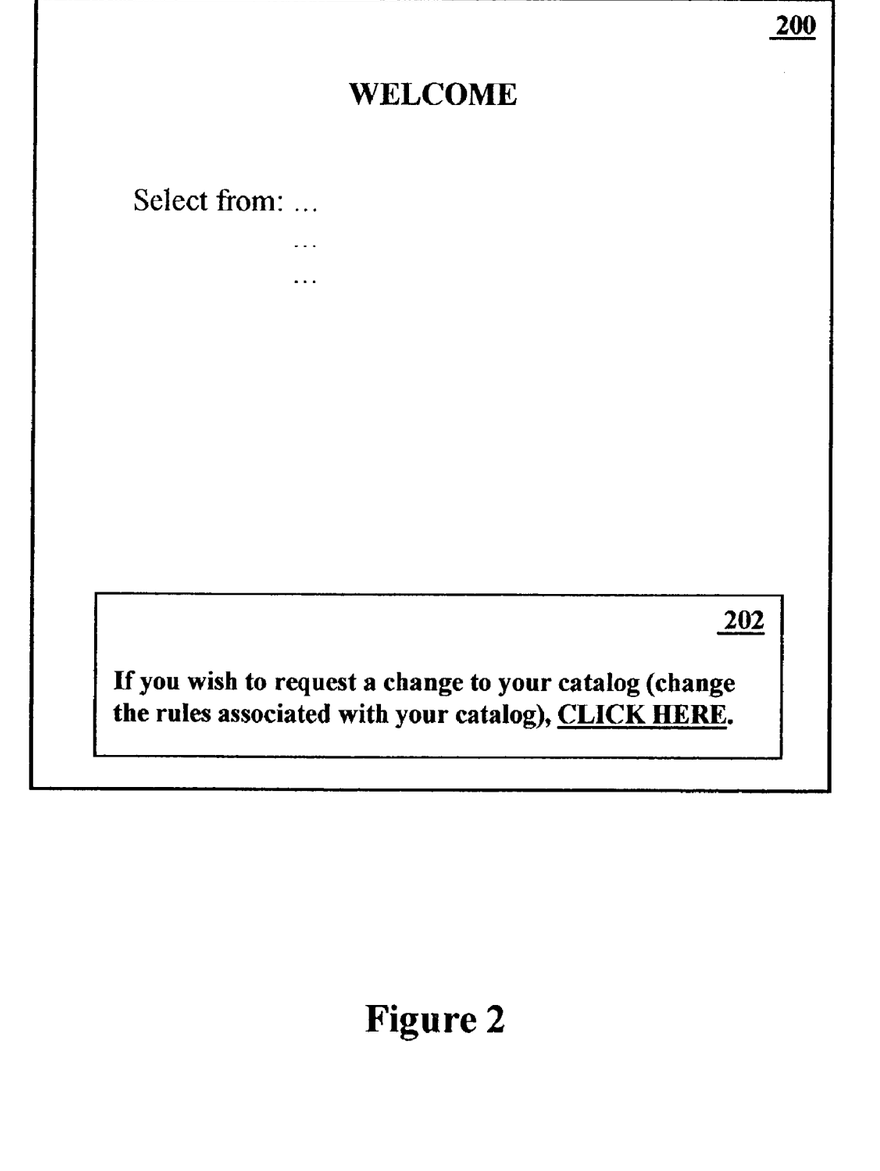
FIG. 2 shows an exemplary means within a catalog for customers to submit rule change requests.

FIG. 2 shows an exemplary "Welcome" window 200 that a customer would encounter after he has logged on to a catalog employing the present system. During a typical session with the catalog, the customer would select an option in the middle of window 200 and move on with his normal course of business. However, if the customer is unhappy with some aspect of the catalog and wishes to request a change to a rule pertaining to the catalog, then the customer would click on the hyperlink provided in window 202. The customer is then transported to the Rule Change Request Form of FIG. 3.

Figure 3:
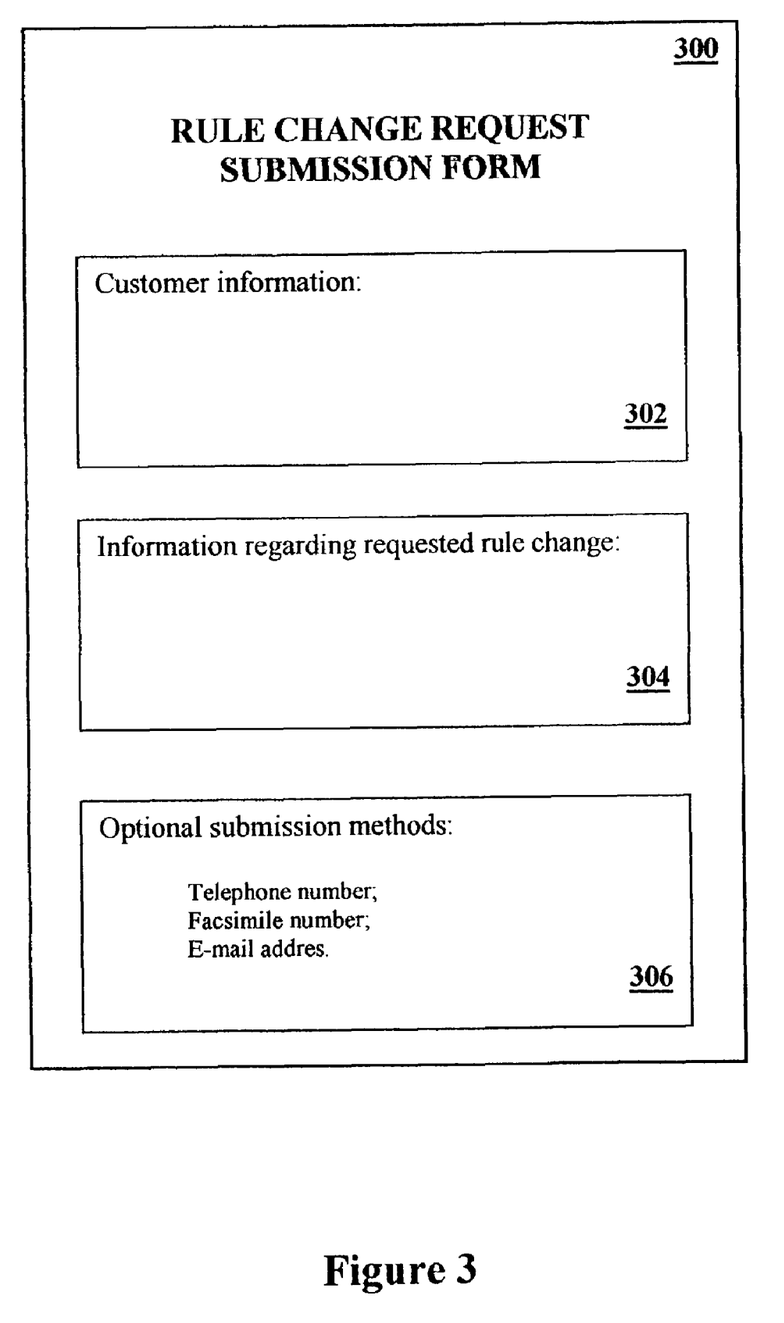
FIG. 3 shows an exemplary rule change request form.

FIG. 3 shows an exemplary form 300 that a customer can use to submit his rule change request. Window 302 provides information on the customer and may be pre-filled out for the customer based on customer information already stored in the system. In this case, the customer would merely check the information provided in window 302 to ensure accuracy. The customer could then change any incorrect information and update any old information, as necessary. Window 302 would include at a minimum, customer name and contact information for the customer. Window 304 preferably includes one or more short questions designed to help the customer explain the rule change that he is requesting. For example, window 304 could include the following questions: "Do you wish to add products to your catalog?"; "Do you wish to exclude products from your catalog?"; "Do you wish to change prices in your catalog?". Each of these questions could be followed by a "check" box or circle, wherein the customer would be allowed to place a "check" next to the appropriate question, thereby indicating an affirmative answer. Window 304 could also provide other options, such as lists of specific products, for the customer to "select" to further explain his request. Window 304 also preferably includes a comments area where the customer can type other information that he believes would be helpful to the owner of the rule in making a decision regarding the request, including reasons or justifications for the request. If the customer, for whatever reason, does not want to submit his rule change request via window 300, then window 306 provides the customer with a voice telephone number, a facsimile telephone number, and an e-mail address with which he may submit his rule change request. The voice telephone number allows the customer to speak with an actual person, or administrator, associated with the catalog. Through a series a questions and answers, the administrator would gather the necessary information from the customer and the administrator would fill out and submit the request for the customer. The facsimile submission method allows the customer to submit his request from any fax machine. The e-mail submission method allows the customer to submit the rule change request from any computer with Internet access. A faxed or e-mailed rule change request would provide the same customer information and rule change information required in window 300. The receipt and processing of a rule change request submitted via facsimile or e-mail could be fully automated, partially automated or handled by an administrator depending on the level of coordination between the catalog system and the customer.

Figure 4:
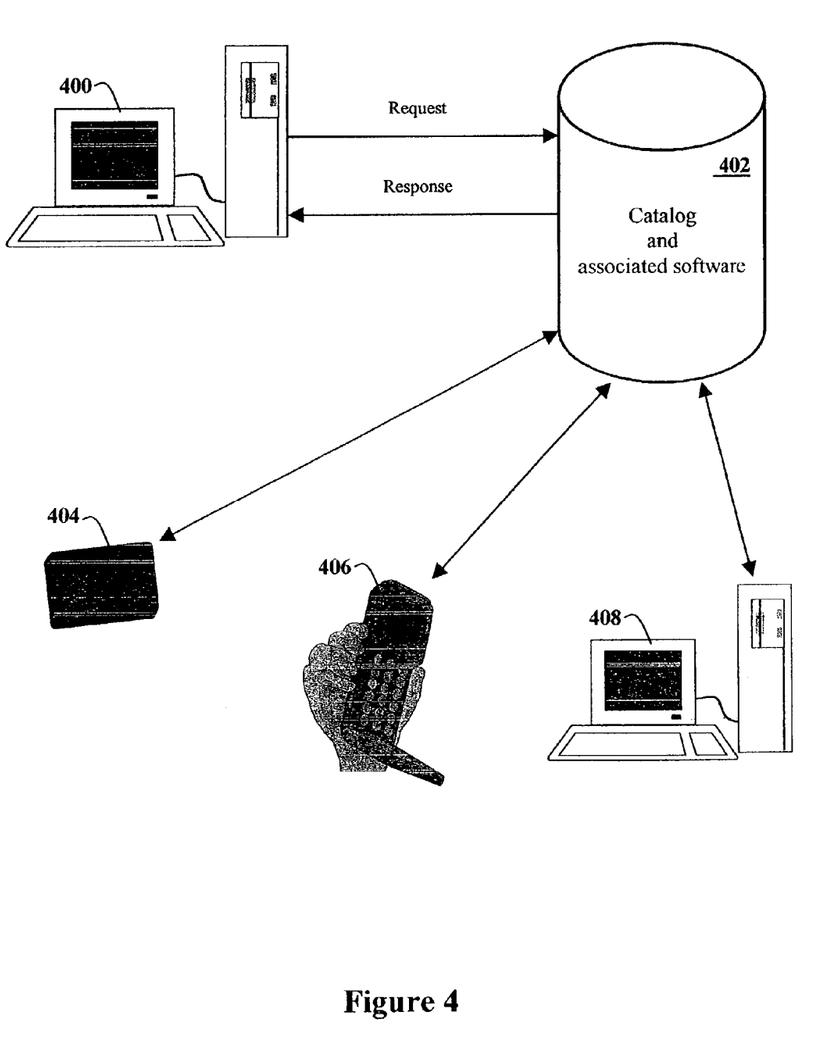
FIG. 4 shows exemplary methods for alerting a rule owner to the presence of a rule change request.

FIG. 4 is intended to show the receipt of a rule change request from a customer, the multiple methods used to alert the owner of the rule to the presence of the request, and the subsequent response sent to the customer. The customer can use his computer 400 to submit the rule change request to the catalog 402. The request can be submitted from computer 400 by filling out the rule change request form of FIG. 3, after the customer has accessed the catalog 402. Computer 400 can also be used to submit the rule change request by e-mail or by fax, provided the computer 400 includes faxing hardware and software. The request is preferably processed within catalog 402 by software associated with the catalog. However, as mentioned above, the present method also provides for intervention by a system administrator when necessary. After the rule change request is received by catalog 402, an automatic search for the owner of the rule is conducted. When the owner of the rule is found, the contact information for the owner of the rule is used to forward the request to the owner, and to alert the owner of the rule to the presence of the request. In the preferred embodiment, the request is sent to the owner of the rule via e-mail. Using e-mail allows a copy of the request to be automatically archived in the rule owner's e-mail account. The owner can also print a hard copy of the request if desired. Of course, other methods may also be used to send the rule change request to the rule owner, including fax and text messaging, for example. After the rule change request has been sent, one or more alerts are immediately sent to the owner of the rule. The methods for alerting the rule owner to the presence of the request are only limited by the communication devices that are carried or owned by the rule owner. A pop-up instant message can be sent to the rule owner's computer 408. Such messages have the inherent ability to the grab a person's attention by immediately appearing as a dedicated window on the person's computer screen. If the person is logged-on to the appropriate network and receives an instant message, a window will pop-up on his screen and remain on the screen until the person closes the pop-up window. Thus, even if the person is away from his desk, the pop-up window will remain displayed until the person returns and subsequently closes the window, after reading the message displayed therein. Pop-up messages and e-mails can optionally be accompanied by a beep or other sound designed to draw the recipient's attention. Another method for alerting the rule owner to the presence of a rule change request is by placing a telephone call to a telephone 406 of the rule owner. The telephone call can be made to a cellular telephone or to a traditional wired telephone. In the preferred embodiment, the telephone call is generated by the software associated with catalog 402, and a pre-recorded message is played for the owner or left as a message on the owner's voice mail. The pre-recorded message indicates to the owner that there is a rule change request that is in need of his attention. Alternatively, the message can be customized to include customer specific information, including the name of the customer and/or the time and date the request was received by the catalog 402. Yet another method for alerting the owner of the rule to the presence of a rule change request is sending a signal to the rule owner's beeper 404, which may also include text messaging capabilities. If beeper 404 includes text messaging capabilities a plain text message, indicating a pending rule change request, is generated and sent by catalog 402 and displayed on the screen of beeper 404. If beeper 404 does not have text messaging capabilities, then a pre-designated numeric code, or telephone number, can be displayed on the beeper, which alerts the rule owner to the pending request. Of course, beeper 404 can also generate one or more "beeps" or be caused to vibrate in order to attract the rule owner's attention. These alerting methods can be employed in a time delayed fashion, wherein the first alert is sent to the rule owner's computer 408, and if there is no response or acknowledgement from the owner within a predefined time period, a second alert is sent to the rule owner's telephone 406. If there is still no response from the rule owner, then a third alert would be sent to the rule owner's beeper 404. Alternatively, more than one alerting method can be initiated simultaneously in a "shotgun" effort to immediately contact the rule owner.

Figure 5:
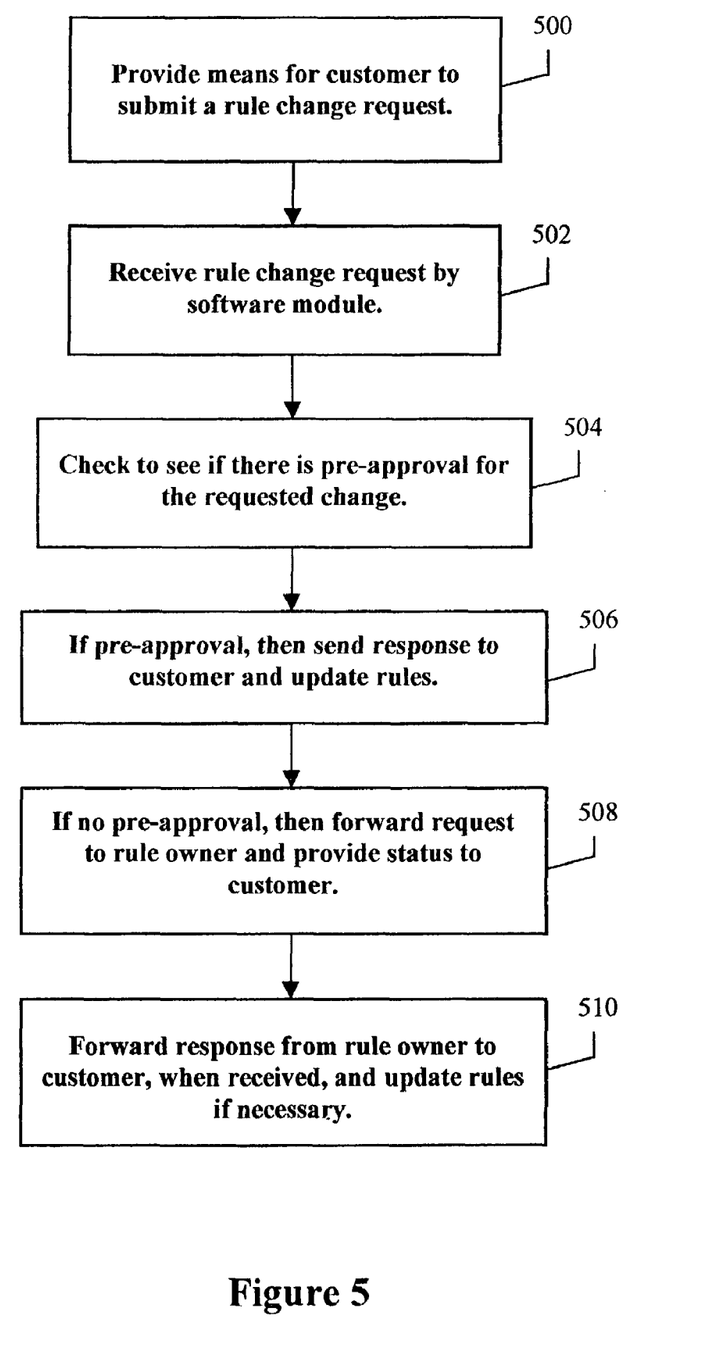
FIG. 5 is a flow chart that shows generalized steps of the present method.

FIG. 5 is a generalized flow chart intended to show the overall operation of the present method. In step 500, a means for submitting the rule change request is provided for the use of the customer. In the preferred embodiment, the means for submitting the rule change request is provided within the catalog itself and comprises a submission form, such as the form shown in FIG. 3. However, other means, including fax and voice telephone, can also be used as the means for submitting a rule change request. In step 502, the rule change request is received by the catalog. Preferably, the request is in electronic form and the software module associated with the catalog provides automated receipt of the request. In step 504, the request is checked against a list of rule changes that have been pre-approved. Pre-approved rule changes can include optional rules inherited from ancestor catalogs, or explicit rules imposed locally that are also optional in nature. In step 506, pre-approved rule change requests are processed by sending a response to the customer, indicating approval, and by changing the set of rules associated with the catalog to reflect the change. Contact information on the customer, either stored within the catalog or provided by the customer in their request, is used to send the response to the customer. In step 508, requests that have not been pre-approved are forwarded to the rule owner, and status, indicating that the request has been forwarded, is sent to the customer. It is important to prevent the customer from becoming frustrated while he is waiting on a response to his request. Providing the customer with the status of his request minimizes customer frustration. In step 510, the owner of the rule responds to the request and the response is forwarded to the customer. If the response is an approval of the request, then the rules associated with the catalog are immediately amended to reflect the change. The revised catalog, reflecting the new set of rules, is then available the next time the customer accesses the catalog. The owner's response is preferably sent to the catalog and forwarded by the catalog to customer. In this way the catalog is forced to create a record of the response thereby documenting the completed transaction. However, the owner of the rule may also send the response directly to the customer. In that case, the rule owner would send a copy of the response to the catalog or send a separate transmission to the catalog indicating that he responded to the request.

Figure 6:
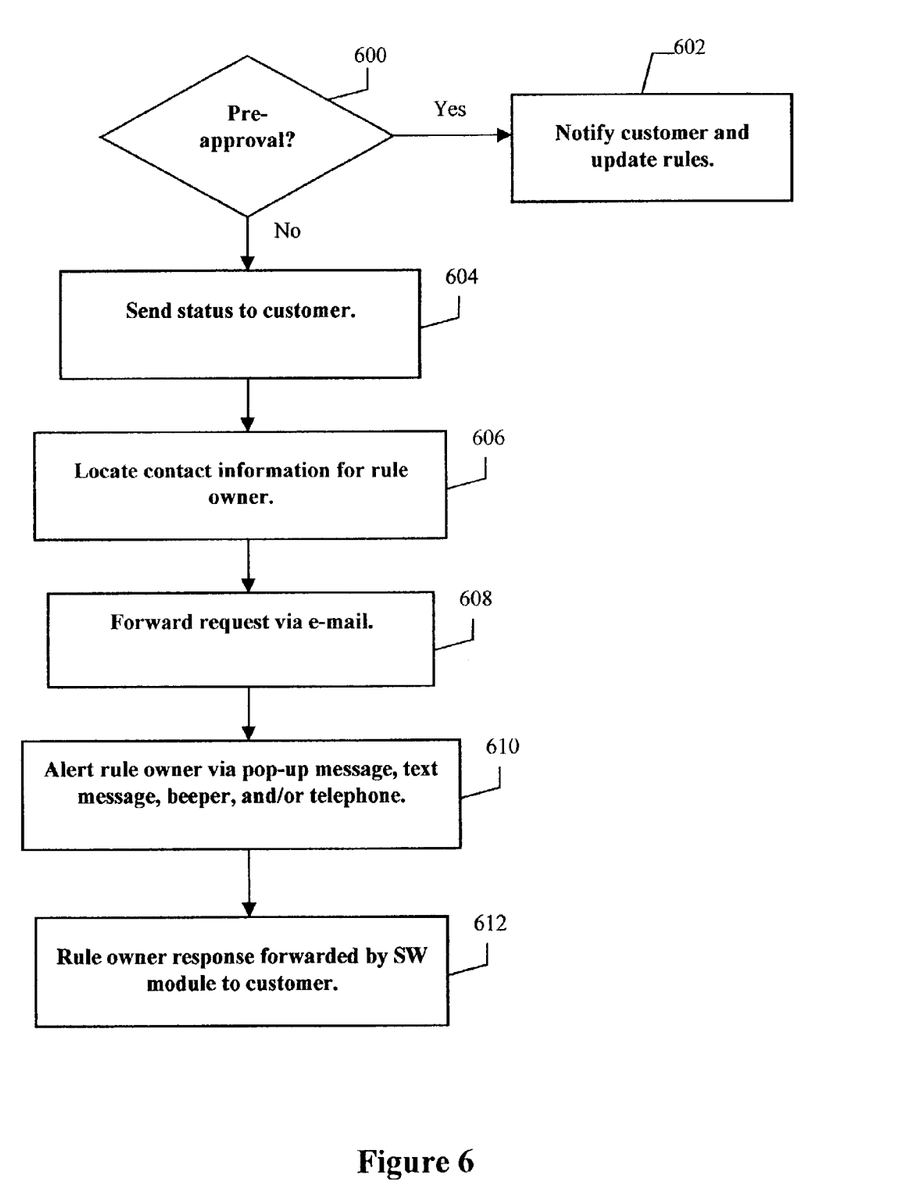
FIG. 6 is a flow chart that shows some of the specific steps of the present method.

FIG. 6 shows specific steps associated with the present method. In step 600, it is determined whether or not the rule change request is one that has been pre-approved. If the request is one that has been pre-approved, the customer is notified of the approval and the set of rules associated with the customer's catalog is updated to reflect the new rule, step 602. If the request is one that has not been pre-approved, then the request must be escalated, or forwarded to the owner of the rule. In step 604, the customer is provided status indicating that his request has been escalated. In step 606, a search is conducted for the owner of the rule. As mentioned above, the owner of the rule can be associated with the catalog or he can be associated with an ancestor catalog. Rule owner's associated with ancestor catalogs may physically reside in a different city or country from the customer. The catalog is, at least logically, linked to its immediate ancestor catalog from which it was derived, and the immediate ancestor is linked to the catalog from which it was derived. This line of ancestry continues until the base catalog, from which all of the catalogs were ultimately derived, is reached. Each catalog is searched, in order of ancestry, until the owner of the rule is found. To use a human analogy, the child catalog (customer's catalog) is searched first, then the parent catalog is searched, then the grandparent catalog. Searching continues until the person that actually imposed the rule, i.e., the owner of the rule, is located. In step 608, the rule change request is forwarded to the owner of the rule via e-mail, in the preferred embodiment. In step 610, one or more alerts are sent to the owner of the rule in order to draw the owner's attention to the pending request. Finally, in step 612, the owner of the rule responds to the request and the response is sent to the customer. The response from the rule owner can be an approval, a denial with reason for denial, or a request from the rule owner to hold a dialog with the customer in order to discuss the requested rule change. Exemplary steps taken when a dialog is requested with the customer are illustrated in FIG. 7.

Figure 7:
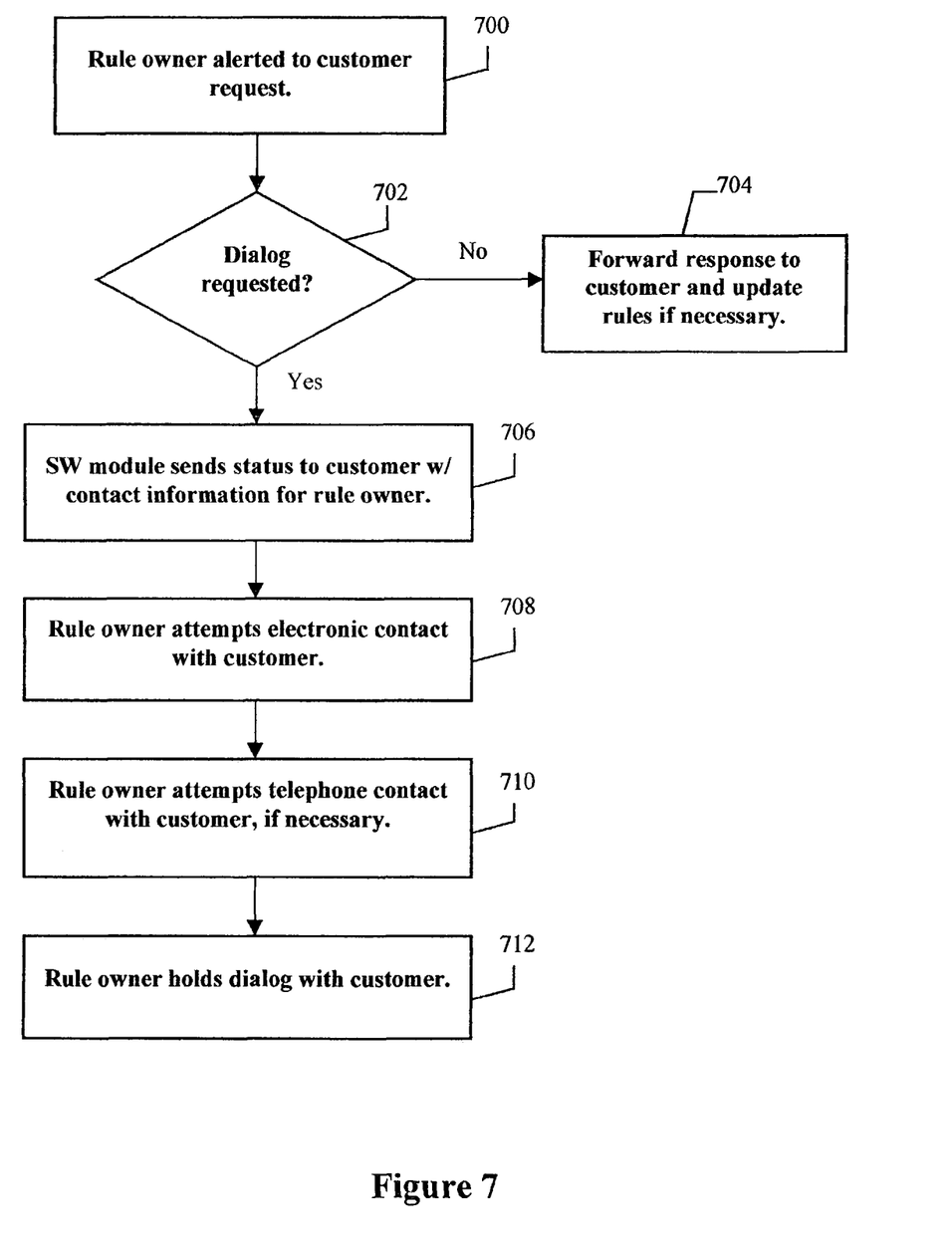
FIG. 7 is a flow chart that shows more specific steps in the present method; and, FIG. 8 is a flow chart that shows exemplary steps for locating an owner of a rule.

Referring to FIG. 7, in step 700, the owner of the rule is alerted to a pending rule change request. In step 702, the rule owner reviews the request and decides whether or not he needs to hold a dialog with the customer to discuss the matter. If no dialog is required, meaning that the response is an approval or a denial, then the response is forwarded to the customer, in step 704, and the rules are updated if the request was approved. If, in step 702, the rule owner decides that a dialog with the customer is necessary, then a message is sent to the customer letting the customer know that a dialog with the customer has been requested by the rule owner, step 706. The message preferably states that the owner will initiate contact with the customer however, the message may also include contact information on the owner of the rule. Giving the customer some information on the person with which he will be discussing his rule change request will empower the customer and minimize frustration. The rule owner will preferably contact the customer on the same day that the owner receives request. However, in the event that a rule owner takes more than a day to contact the customer, the customer can use the rule owner's contact information to initiate contact with the rule owner, if desired. In step 708, the rule owner attempts electronic contact with the customer. Electronic contact includes e-mail and instant messaging. If contact by electronic means is unsuccessful, then in step 710, the rule owner attempts telephone contact with the customer. Of course, the rule owner can skip step 708, if desired, and move directly to trying to contact the customer via telephone. Preferably, contact information for the customer is sent to the rule owner along with the rule change request. In step 712, the rule owner and the customer hold a dialog to discuss the requested rule change and come to some agreement concerning the rule change request. If the result of the dialog is an approval of the request, then the rules associated with the catalog are changed to reflect the rule change.

Figure 8:
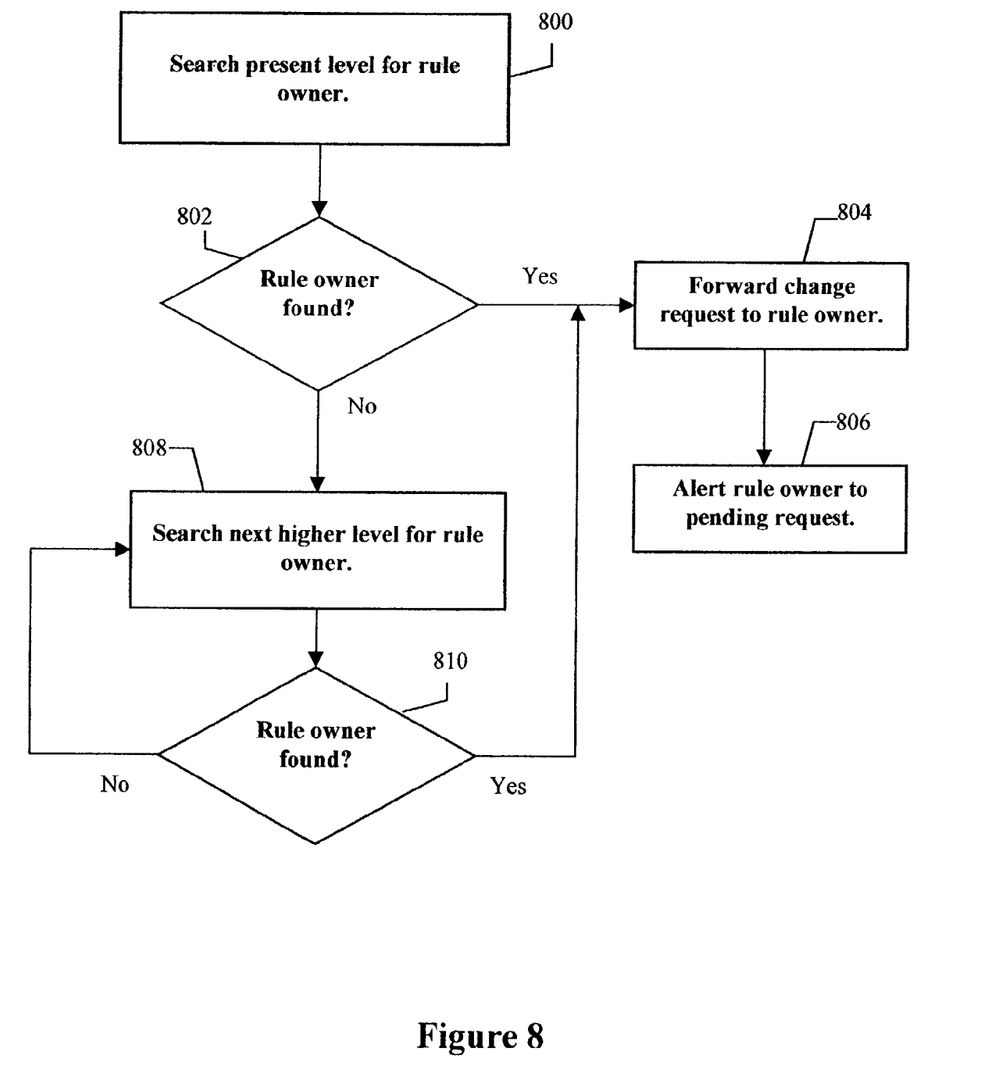

FIG. 8 shows the steps followed when a search is conducted to find the owner of the rule. In step 800, the rule owners associated with the customer's catalog are searched. In step 802, it is determined whether or not the rule owner is found. If the rule owner is found, the rule change request is forwarded to the rule owner, in step 804, and the rule owner is alerted to the pending request, step 806. If the rule owner is not found at the present (local) level, then the rule owners associated with the catalog in the next higher level (immediate ancestor) is searched, step 808. In step 810 it is determined whether or not the rule owner was found in step 808. If the rule owner was found, then the contact information associated with the rule owner is used to forward the request to the owner and the owner is alerted to the request, steps 804 and 806. If in step 810 it was determined that the rule owner was not found, then the catalog in the next higher level is searched for the owner of the rule, step 808. This process of searching higher and higher level catalogs is repeated until the owner of the rule is found. When the rule owner is found, the request is forwarded to him and the rule owner is alerted to the request. It is worth repeating at this point that customer as used herein includes marketers, sellers both direct and indirect, developers, manufacturers and distributors. Furthermore, there may be many more levels of catalogs then the three levels shown in FIG. 1.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A method for immediate escalation of a rule change request from a customer to change a rule that applies to a catalog associated with the customer, wherein the rule is a member of a set of rules that are used to create the catalog and the request is escalated until it reaches an owner of the rule, and wherein the catalog and the set of rules are stored and executed on networked computer hardware, the method comprising the steps of:
   providing a means for the customer to submit the rule change request;
   receiving the rule change request by a software module associated with the catalog;
   processing the request to see if the rule change request has been pre-approved, wherein if the request has been pre-approved an automated response indicating approval of the request is sent to the customer and the set of rules are changed to reflect the approved rule change, and if the request has not been pre-approved;
   locating the owner of the rule;
   forwarding the request to the owner of the rule;
   alerting the owner of the rule to the presence of the request; and,
   sending a response from the owner of the rule to the customer, wherein the response indicates an approval of the request, a disapproval of the request with a reason for the disapproval, or a subsequent request from the owner of the rule to hold a dialog with the customer to discuss the rule change request, and wherein if the response is an approval, the set of rules are changed to reflect the approved rule change.

2. The method of claim 1, wherein the step of providing further comprises the step of:
   providing a means within the catalog for the customer to submit the rule change request, wherein the means is a hyperlink to a request form, a voice telephone number, a facsimile telephone number, or an e-mail address.

3. The method of claim 1, wherein the step of alerting further comprises the step of:
   sending an e-mail message, a pop-up instant message, a text message, a telephone call, or a combination of these to the owner of the rule, wherein the telephone call is initiated by an administrator or by the software module.

4. The method of claim 1, wherein the software module associated with the catalog includes a tracking program that stores information related to each rule change request.

5. The method of claim 1, wherein the rule change request pertains to prices that are applicable to the customer, inclusion of products, services or capabilities within the catalog, or exclusion of products, services or capabilities from the catalog.

6. The method of claim 1, wherein the step of forwarding further comprises the step of:
   including with the request, information about the customer including contact information for the customer, a description of the rule change that is being requested, and time and date information.

7. The method of claim 1, wherein the catalog is a sub-catalog that was derived from one or more ancestor catalogs, and the owner of the rule is associated with the sub-catalog or one of the one or more ancestor catalogs, and wherein each of the one or more ancestor catalogs has an associated software module that stores information on local owners of rules.

8. The method of claim 7, wherein the step of locating further comprises the step of:
   searching the software module associated with the sub-catalog for contact information on the owner of the rule, and if the information is not found then searching the software module(s) associated with the one or more ancestor catalogs in order of ancestry until the contact information is found.

9. The method of claim 1, wherein the step of sending a response further comprises the step of:
   sending an e-mail message, a pop-up instant message, or a text message to the customer, or making a telephone call to the customer, or a combination of these.

10. An electronic catalog that provides immediate escalation of a rule change request from a customer associated with the catalog to change a rule that applies to the catalog, wherein the rule is a member of a set of rules that are used to create the catalog and the request is escalated until it reaches an owner of the rule, and wherein the catalog and the set of rules are stored and executed on networked computer hardware, the catalog comprising:
    a means for the customer to submit the rule change request;
    a software module that receives the rule change request and processes the request to see if the rule change request has been pre-approved, wherein if the request has been pre-approved the software module sends an automated response indicating approval of the request to the customer and changes the set of rules to reflect the approved rule change;
    a search and forward program that receives rule change requests from the software module that have not been pre-approved and searches for the owner of the rule, and upon locating the owner of the rule, forwards the rule change request to the owner of the rule; and,
    an alerting program that receives information from the search and forward program when the rule change request has been forwarded to the owner of the rule and sends out one or more alerts to the owner of the rule to alert the owner of the rule to the presence of the request.

11. The electronic catalog of claim 10, wherein the catalog further comprises:
    a response program that receives and forwards a response from the owner of the rule, wherein the response indicates an approval of the request, a disapproval of the request with a reason for the disapproval, or a subsequent request from the owner of the rule to hold a dialog with the customer to discuss the rule change request, and wherein if the response is an approval, the response program changes the set of rules to reflect the approved rule change.

12. The catalog of claim 11, wherein the response from the owner of the rule is sent to the customer via one or more of the following methods: an e-mail message; a pop-up instant message; a text message; and a telephone call.

13. The catalog of claim 10, wherein the means for the customer to submit the rule change request is a hyperlink to a request form, a voice telephone number, a facsimile telephone number, or an e-mail address.

14. The catalog of claim 10, wherein the one or more alerts sent to the owner of the rule are sent by e-mail message, pop-up instant message, text message, or telephone call, wherein the telephone call is initiated by the alerting program or by an administrator that is notified by the alerting program.

15. The catalog of claim 10, wherein the catalog further comprises:

a tracking program that stores information related to each rule change request.

16. The catalog of claim 10, wherein the rule change requests is in regards to prices that are applicable to the customer, inclusion of products, services or capabilities within the catalog, or exclusion of products, services or capabilities from the catalog.

17. The catalog of claim 10, wherein the search and forward program forwards information about the customer along with the request, including contact information for the customer, a description of the rule change that is being requested, and time and date information, to the owner of the rule.

18. The catalog of claim 10, wherein the catalog is a sub-catalog that was derived from one or more ancestor catalogs, and the owner of the rule is associated with the sub-catalog or one of the one or more ancestor catalogs, and wherein each of the one or more ancestor catalogs includes software that provides the same functions as the software module, the search and forward program, and the alerting program.

19. The catalog of claim 17, wherein the search and forward program searches the sub-catalog for contact information on the owner of the rule first, and if the contact information on the owner of the rule is not found, then the search and forward program causes the ancestor catalogs to be searched, in order of ancestry, for the contact information.

* * * * *